Aug. 17, 1943.　　W. A. DUFFIELD　　2,326,994
AUTOMATIC SPEED CHANGE GEARING
Filed Oct. 3, 1942　　2 Sheets-Sheet 1

INVENTOR.
WILLIAM A. DUFFIELD,
BY
Hood & Hahn
ATTORNEYS.

Aug. 17, 1943.  W. A. DUFFIELD  2,326,994
AUTOMATIC SPEED CHANGE GEARING
Filed Oct. 3, 1942  2 Sheets-Sheet 2

INVENTOR.
WILLIAM A. DUFFIELD,
BY Hood & Hahn
ATTORNEYS.

Patented Aug. 17, 1943

2,326,994

UNITED STATES PATENT OFFICE 2,326,994

AUTOMATIC SPEED CHANGE GEARING

William A. Duffield, Windsor, Ontario, Canada, assignor to Windfields, Limited, Montreal, Quebec, Canada, a corporation of Canada Application October 3, 1942, Serial No. 460,611

8 Claims. (Cl. 74—189.5)

The object of my present invention is to produce an improved speed change gearing of the epicyclic type having a capacity of three speeds forward and one reverse, the arrangement being such that the flow of power through the mechanism is automatically dependent on the differential between load torque and input torque and wherein excess of load torque over input torque cannot result in impressing reverse forces upon the gearing.

A further object of my invention is to apply power to such a gearing through the medium of a fluid coupling having two runner elements in series, wherein excess of load torque over input torque cannot result in impressing reverse forces on the gearing through the medium of the second runner of the coupling.

The accompanying drawings illustrate my invention.

Figure 1:
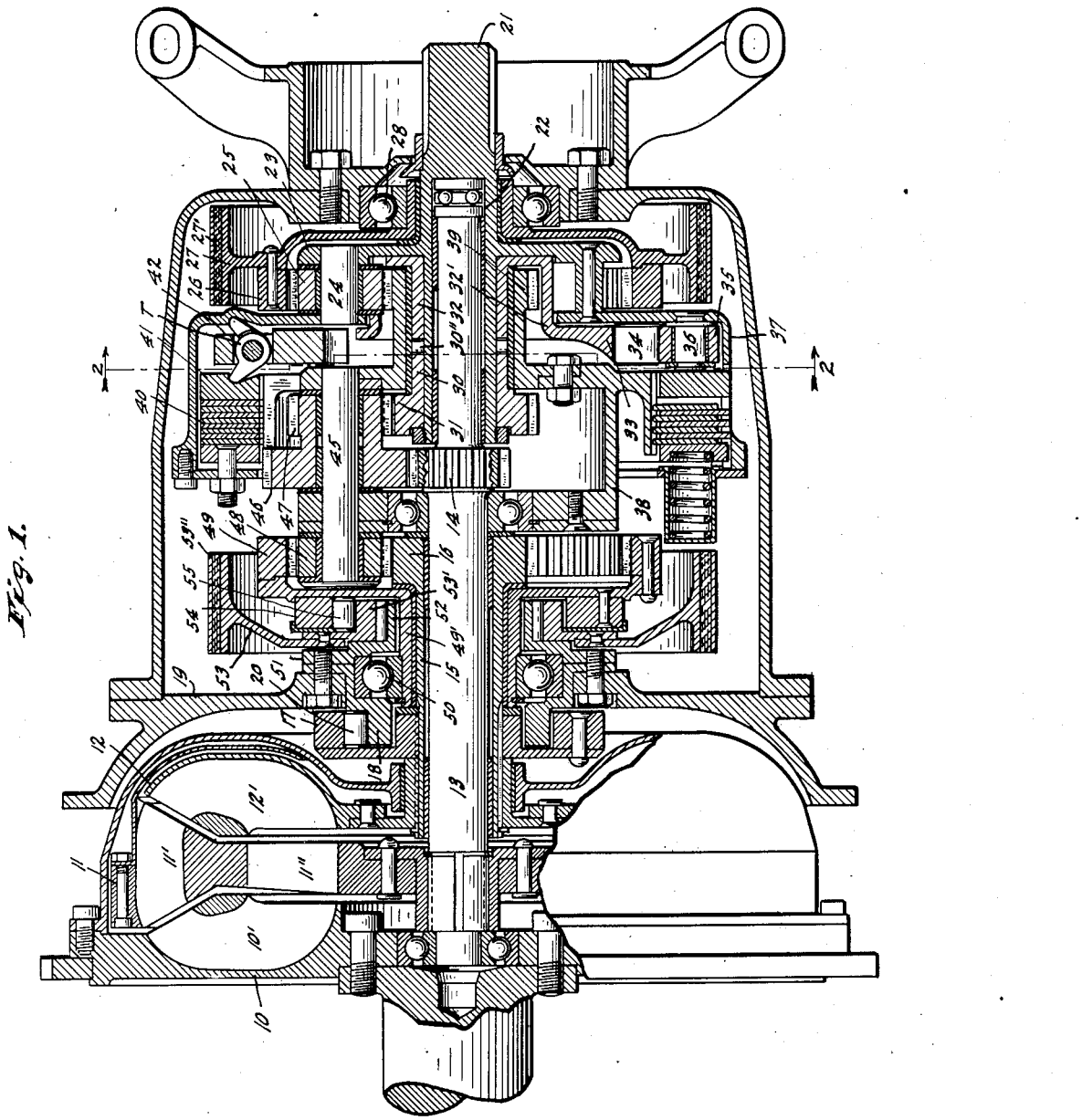

Fig. 1 is an axial section of an embodiment of my invention; and

Figure 2:
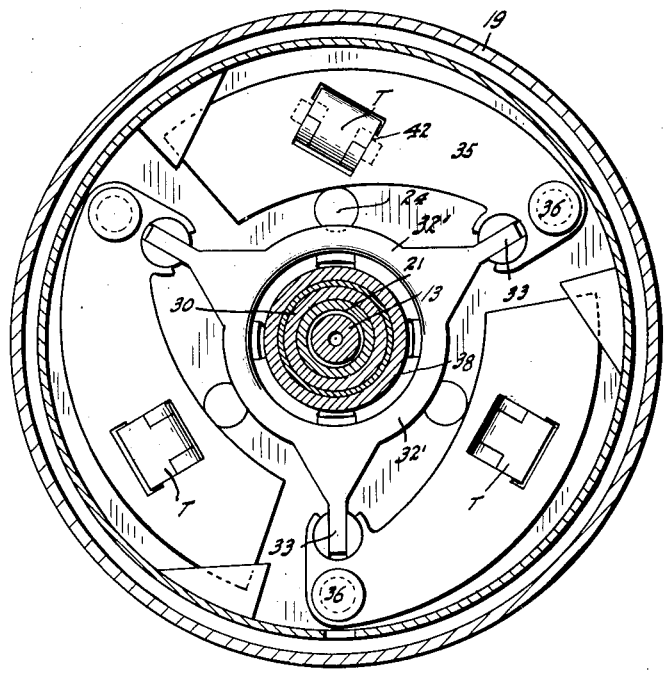

Fig. 2 a section on line 2—2 of Fig. 1.

In the drawings 10 indicates the impeller element of a fluid coupling which comprises, a first runner 11 and a second runner 12 which are concentric with the impeller and the passages through which are such that flow of the coupling liquid will be in series through two runners, runner 11 having an outer ring of passages 11', and an inner ring of passages 11" interposed between the outer and inner ends of the passages 10' of the impeller 10 and 12' of the second runner 12.

Runner 11 is keyed to a power-receiving shaft 13 which is coaxial with impeller 10 and is provided at an intermediate point in its length with a first sun gear 14.

Runner 12 is keyed to a power-receiving sleeve shaft 15 journalled on the input end of shaft 13 and provided at its inner end with a second sun gear 16.

Keyed to sleeve shaft 15 is a brake ring 17 which envelops a brake ring 18 carried by casing 19 and one-way brake elements 20 are interposed between parts 17 and 18 in such manner as to prevent reverse rotation of runner 12 and the second sun gear 16 but permit forward rotation of said runner and gear.

The output shaft 21 is provided at its inner end with an axial pocket 22 in which the output end of shaft 13 is journalled. The output shaft 21 is provided with a flange 23 provided with a plurality of planetary pins 24 upon each of which is journalled a planetary gear 25 meshing with ring gear 26 carried by the brake drum 27 which is journalled in casing 19 by bearing 28. The output shaft 21 is journalled in drum 27 and said drum may be selectively held stationary by brake band 27'.

Journalled upon the inner end of the output shaft 21 is a sleeve 30 provided at its inner end with a third sun gear 31 and at its outer end with clutch teeth 30" which mesh with similar teeth at the inner end of a sleeve 32 having a flange 32' provided with a plurality of radiating arms 33, each of which extends diametrically into a pin 34 journalled in the short arm of a speed-sensitive bell crank lever 35 weighted at its outer end and pivoted on a planetary pin 36 carried by a clutch casing 37 which envelops a planetary gear carrier 38 surrounding sleeve 30 and provided with a fourth sun gear 39 meshing with the planetary gears 25.

Between casing 37 and carrier 38 are interposed interdigitated friction rings 40 which may be clamped together by clamping rings 41 between which and casing 37 is interposed toggle T which is seated in a pocket 42 formed in the weighted end of lever 35, the arrangement being such that when the speed-sensitive levers 35 swing outwardly to a sufficient extent, toggle T serves to clamp rings 41 upon rings 40 so as to integrate casing 37 and carrier 38.

Pins 24 extend into casing 37 and thus rotatively connect casing 37 with the output shaft 21.

Carrier 38 is provided with a plurality of planetary pins 45 upon each of which is journalled an integrated planetary gear set comprising a gear 46 meshing with the first sun gear 14 and a gear 47 meshing with the third sun gear 31. Also journalled on each pin 45 is a planetary gear 48 which may rotate independently of gear 46—47 and meshes with a ring gear 49, the sleeve hub 49' of which is journalled on sleeve 15 and is supported by bearing 50 in the casing 19. Bolted to casing 19 is a ring 51 provided with an axial sleeve 52 upon which is journalled a brake drum 53 having a clutch hub 53'. Secured to element 49—49' is a clutch ring 54 between which and the clutch hub 53' is interposed a one-way clutch roller 55 which permits forward rotation of the ring gear 49 but prevents reverse rotation of the ring gear 49 when drum 53 is held against rotation. Associated with drum 53 is a clamping ring 53" by means of which said drum may be selectively held against rotation.

Before impeller 10 overcomes the load torque impressed upon runner 11 the coupling fluid may impress a reverse turning moment on runner 12 but brake 20 prevents reverse rotation of runner 12 and thus prevents impression of any reverse forces in opposition to forward rotation of the output shaft.

When runner 11 begins to move forwardly, the flow of power is through shaft 13 to gear 14 so as to rotate compound gear 46—47 on its pin 45 and exert a reverse turning force on carrier 38, but gear 16 is locked against rotation by brake 17 and gear 49 is held against reverse rotation by clutch 55 so that reverse rotation of carrier 38 is prevented. Rotation of gear 46—47 causes rotation of gear 31, which, through arms 33, levers 35, pins 36, casing 37 and flange 23, causes forward rotation of casing 37 and output shaft 21 at low speed.

As the differential between engine torque and load torque decreases, impeller 12 will start forwardly, but at a lower speed than impeller 11, and will ultimately assume part of the load, through gears 16 and 48, thus causing gear 48 to roll within gear 49 to start carrier 38 forwardly, thereby increasing the forward speed of the output shaft.

As the differential between engine torque and load torque continues to decrease, impeller 12 will assume more and more of the load as the speed of impeller 12 approaches that of impeller 11 at which time the forward speed of carrier 38 will differ from that of the casing 37 by the difference between the second and high gear ratios plus the slippage between 11 and 12. At this time the obstructive action of arms 33 on weighted levers 35 will have diminished enough to permit those levers to respond to the centrifugal forces so as to permit toggles T to clamp ring 41 on disks 40 to couple carrier 38 and casing 37 to establish direct drive through impeller 11 and the output shaft.

It will be noted that at the time casing 37 and carrier 38 are coupled, all of the elements of the epicyclic gearing, including carrier 38, saving only ring gear 49, are in forward movement so that said coupling is effected without shock. When direct drive is established, ring gear 49 will be rotated forwardly over clutch 55.

It will be noted that when the parts are acting in low impeller 11 is the sole input element, and impeller 11 is the sole input element in direct drive where 37 and 38 are clutched together, but that during intermediate torque conditions, both impellers 11 and 12 are input elements.

Whenever the load torque increases beyond the capacity of direct drive the parts will automatically assume the necessary lower-gear relation, reverting again automatically to higher-gear relation as the torque differential decreases.

For reverse drive, brake band 53" is released and brake band 27' clamped upon drum 27 so as to hold ring gear 26 stationary. Thereupon the flow of power is from impeller 11, through shaft 13, gear 14, unitary gear 46—47, and pin 45 to rotate carrier 38 reversely, thereby rotating gear 39 to cause it to roll within ring gear 27 and thus drive the output shaft reversely.

It will be noticed that driving effort is at all times being impressed on shaft 13. Consequently, when toggle T operates to unify carrier 38, casing 37, and the output shaft 21, the load torque immediately reverts back to runner 11 but immediately upon a sufficient increase of load torque to result in a drop of output shaft speed which will permit retraction of toggle T, load torque is immediately impressed on runner 12.

I claim as my invention:

1. An epicyclic gearing comprising a power-receiving shaft carrying a first sun gear, a power-receiving sleeve shaft sleeved on said first shaft and carrying a second sun gear, an output shaft, a third sun gear, a connection between the third sun gear and the output shaft by which the third sun gear may rotate the output shaft, a planetary carrier coaxial with the aforesaid gears, a planetary gear unit journalled on said carrier and having two sets of gear teeth, one meshing with the first sun gear and the other meshing with the third sun gear, a second planetary gear journalled on said carrier for rotation independently of said planetary unit and meshing with the second sun gear, a ring gear meshing with said last-mentioned planetary gear, means blocking reverse rotation of said second gear, means for blocking rotation of said ring gear, and means for connecting said carrier and output shaft.

2. Gearing of the character specified in claim 1, wherein the means blocking reverse rotation of the ring gear is controllable to permit reverse rotation thereof and of the planetary carrier, and including a fourth sun gear carried by the planetary carrier, a planetary gear carried by the output shaft and meshing with the fourth sun gear, a ring gear meshing with said last-mentioned planetary gear, and controllable means for holding said last-mentioned ring gear against rotation.

3. An epicyclic gearing comprising a power-receiving shaft carrying a first sun gear, a power-receiving sleeve shaft sleeved on said first shaft and carrying a second sun gear, an output shaft, a third sun gear, a planetary carrier coaxial with the aforesaid gears, a clutch interposed between the output shaft and said carrier, a speed sensitive clutch actuator carried by the output shaft, a connection between the third sun gear and said actuator opposing the speed-sensitiveness of said actuator, a planetary gear unit journalled on said carrier and having two sets of gear teeth, one meshing with the first sun gear and the other meshing with the third sun gear, a second planetary gear journalled on said carrier for rotation independently of said planetary unit and meshing with the second sun gear, a ring gear meshing with said last-mentioned planetary gear, means for blocking reverse rotation of the second sun gear, means for blocking rotation of said ring gear, and means for connecting said carrier and output shaft.

4. An epicyclic gearing comprising a power-receiving shaft carrying a first sun gear, a power-receiving sleeve shaft sleeved on said first shaft and carrying a second sun gear, an output shaft, a third sun gear, a planetary carrier coaxial with the aforesaid gears, a clutch interposed between the output shaft and said carrier, a speed-sensitive clutch actuator carried by the output shaft, a connection between the third sun gear and said actuator opposing the speed-sensitiveness of said actuator, a planetary gear unit journalled on said carrier and having two sets of gear teeth, one meshing with the first sun gear and the other meshing with the third sun gear, a second planetary gear journalled on said carrier for rotation independently of said planetary unit and meshing with the second sun gear, a ring gear meshing with said last-mentioned planetary gear, means blocking reverse rotation of the second sun gear, means for blocking rotation of said ring gear, means for connecting said carrier and output shaft wherein the means for blocking reverse rotation of the ring gear is controllable to permit reverse rotation thereof and of the planetary carrier, and including a fourth sun gear carried by the planetary carrier, a planetary gear carried by the output shaft and meshing with the fourth sun gear, a ring gear meshing with said last-mentioned planetary gear, and controllable means for holding said last-mentioned ring gear against rotation.

5. Gearing of the character specified in claim 1 and including a power delivery fluid coupling comprising an impeller, a first runner connected to the first sun gear, and a second runner connected to the second sun gear.

6. Gearing of the character specified in claim 3 and including a power delivery fluid coupling comprising an impeller, a first runner connected to the first sun gear, and a second runner connected to the second sun gear.

7. Gearing of the character specified in claim 1 wherein the means for blocking rotation of the ring gear is controllable to permit reverse rotation thereof and of the planetary carrier, and including a fourth sun gear carried by the planetary carrier, a planetary gear carried by the output shaft and meshing with the fourth sun gear, a ring gear meshing with said last-mentioned planetary gear, controllable means for holding said last-mentioned ring gear against rotation, a power delivery fluid coupling comprising an impeller, a first runner connected to the first sun gear, and a second runner connected to the second sun gear.

8. Gearing of the character specified in claim 3 wherein the means for blocking rotation of the ring gear is controllable to permit reverse rotation thereof and of the planetary carrier, and including a fourth sun gear carried by the planetary carrier, a planetary gear carried by the output shaft and meshing with the fourth sun gear, a ring gear meshing with said last-mentioned planetary gear, controllable means for holding said last-mentioned ring gear against rotation, a power-delivery fluid coupling comprising an impeller, a first runner connected to the first sun gear, and a second runner connected to the second sun gear.

WILLIAM A. DUFFIELD.